INVENTORS
FRED W. SCHAAF
GLENN L. SCOTT
SANDER RUBIN

BY G. R. Gugger
AGENT

March 10, 1964 F. W. SCHAAF ETAL 3,124,784

CATHODE RAY TUBE PRINTER

Filed Dec. 23, 1959 4 Sheets-Sheet 3

March 10, 1964 F. W. SCHAAF ET AL 3,124,784

CATHODE RAY TUBE PRINTER

Filed Dec. 23, 1959 4 Sheets-Sheet 4

3,124,784

CATHODE RAY TUBE PRINTER

Fred W. Schaaf and Glenn L. Scott, Apalachin, and Sander Rubin, Poughkeepsie, N.Y., assignors to International Business Machines Corporation, New York, N.Y., a corporation of New York Filed Dec. 23, 1959, Ser. No. 861,594
4 Claims. (Cl. 340—173)

Figure 1A:
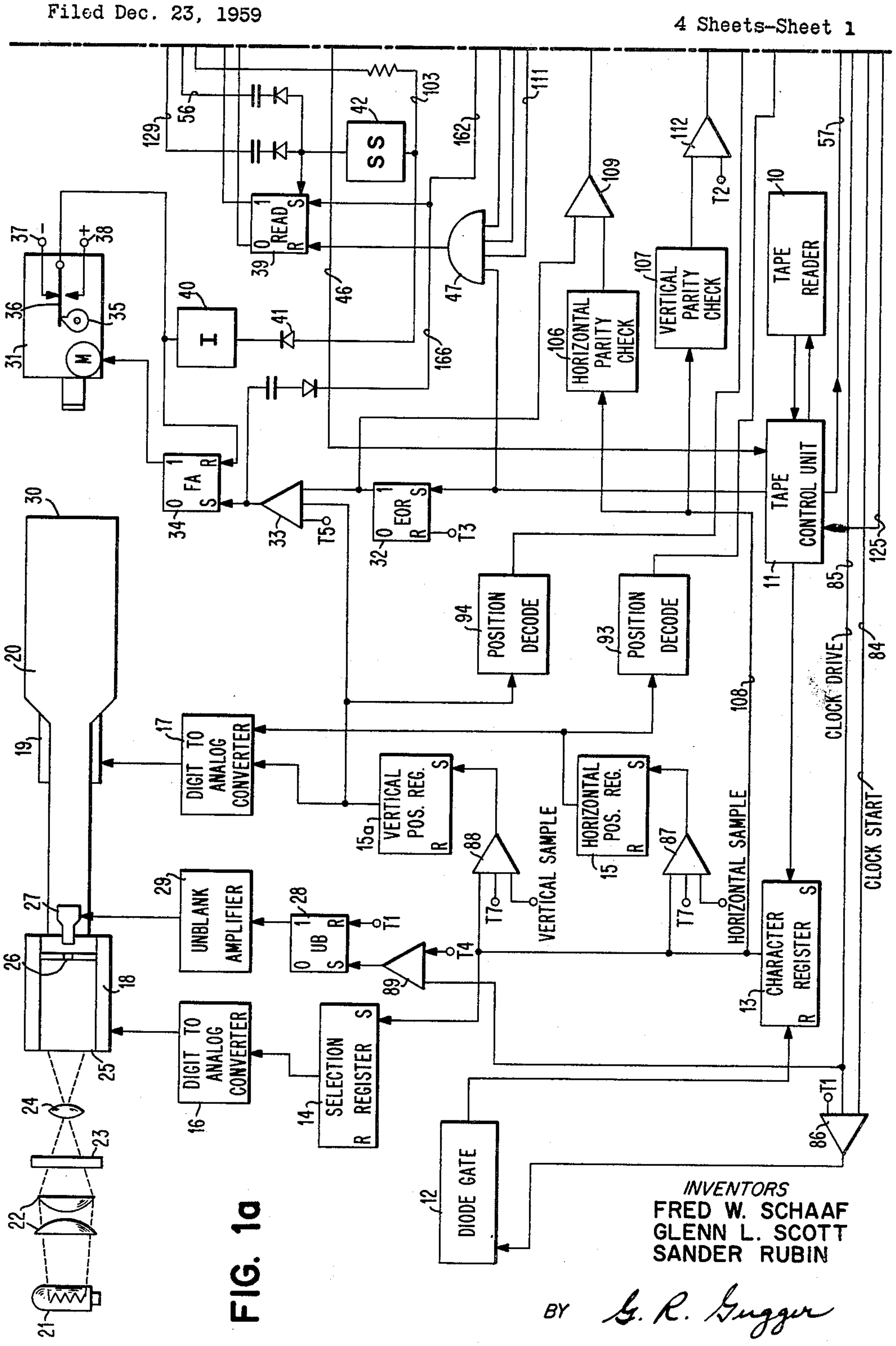

This invention relates to a cathode ray tube printer and more particularly to a printer provided with control means operable to carry out a frame reprint operation.

The present invention is directed to a cyclically operable printer system which functions to transform information from magnetic tape into a character display on the face of a cathode ray tube. This display is then photographed on 35 mm. microfilm to make a permanent record of the displayed information. In a printer of this nature when an error in printing occurs, it is a distinct advantage if the system can be operated to carry out a reprint cycle. For example, in normal operation, a positioning error or a redundancy error, when detected, will stop the printer. However, if the error was of the spurious type, it is possible that it might not occur again if the same section of tape is read a second time. It can be appreciated that by taking a reprint cycle and ascertaining that the error did not repeat, the operation of the system may be continued without the necessity of shutting down and trouble shooting.

In carrying out the above reprint feature, the present invention makes use of an End-Of-Record counter capable of counting up to 128 records, which is the maximum number of records allotted to any one frame of film. The counter is reset after every frame advances by a CRT Ready line in the printer. In operation, a positioning or redundancy error will cause the CRT Ready line to drop and to stay down, thereby stopping the tape advance. When this occurs, the operator may continue printing without trying to reprint by operating a Restart switch. If, however, the operator actuates a Frame Reprint switch, the error triggers in the printer are reset and the End-Of-Record counter complements and adds one. The tape drive is then operated to run the tape backward to its starting position for that frame as determined by the End-Of-Record counter which counts the gaps between the records. When the tape stops, a signal to the printer advances the film to the next frame. Following the film frame advance, the frame is reprinted, and if no error occurs this time, printing continues in the normal manner.

Accordingly, the main object of the present invention is to provide an improved cathode ray tube printer system which is provided with an arrangement for effecting a reprint cycle of operation upon the occurrence of an error.

A further object of the present invention is to provide a cathode ray tube printer system which functions to transform digital input information from magnetic tape into a character display on the face of the tube and then to photograph the display on film, the system being further provided with means for backing up a section of tape and for effecting a reprint cycle of operation of the printer.

A still further object of the present invention is to provide a cathode ray tube printer system as in the preceding object and which includes an End-Of-Record counter for controlling the extent of tape backup preparatory to a reprint cycle.

A still further object of the present invention is to provide a cathode ray tube printer system for transforming information from magnetic tape into a character display on the face of the tube and then to photograph the display on film, and including means selectively operable to effect resetting of the printer, backing up of the tape, and an advancement of film to carry out a reprint cycle of operation.

A still further object of the present invention is to provide an improved cathode ray tube printer system for transforming information from a group of records on tape onto a frame of film and which includes means for backing up the tape and counter means operable to count the gaps between records on the tape to determine when the starting position is reached for the film frame so that a reprint cycle may be carried out.

The foregoing and other objects, features and advantages of the invention will be apparent from the following more particular description of a preferred embodiment of the invention, as illustrated in the accompanying drawings.

In the drawings:

FIG. 1*a* is a block diagram showing the general arrangement of the system embodying the invention and including part of the logic circuitry for the frame reprint.

Figure 1B:
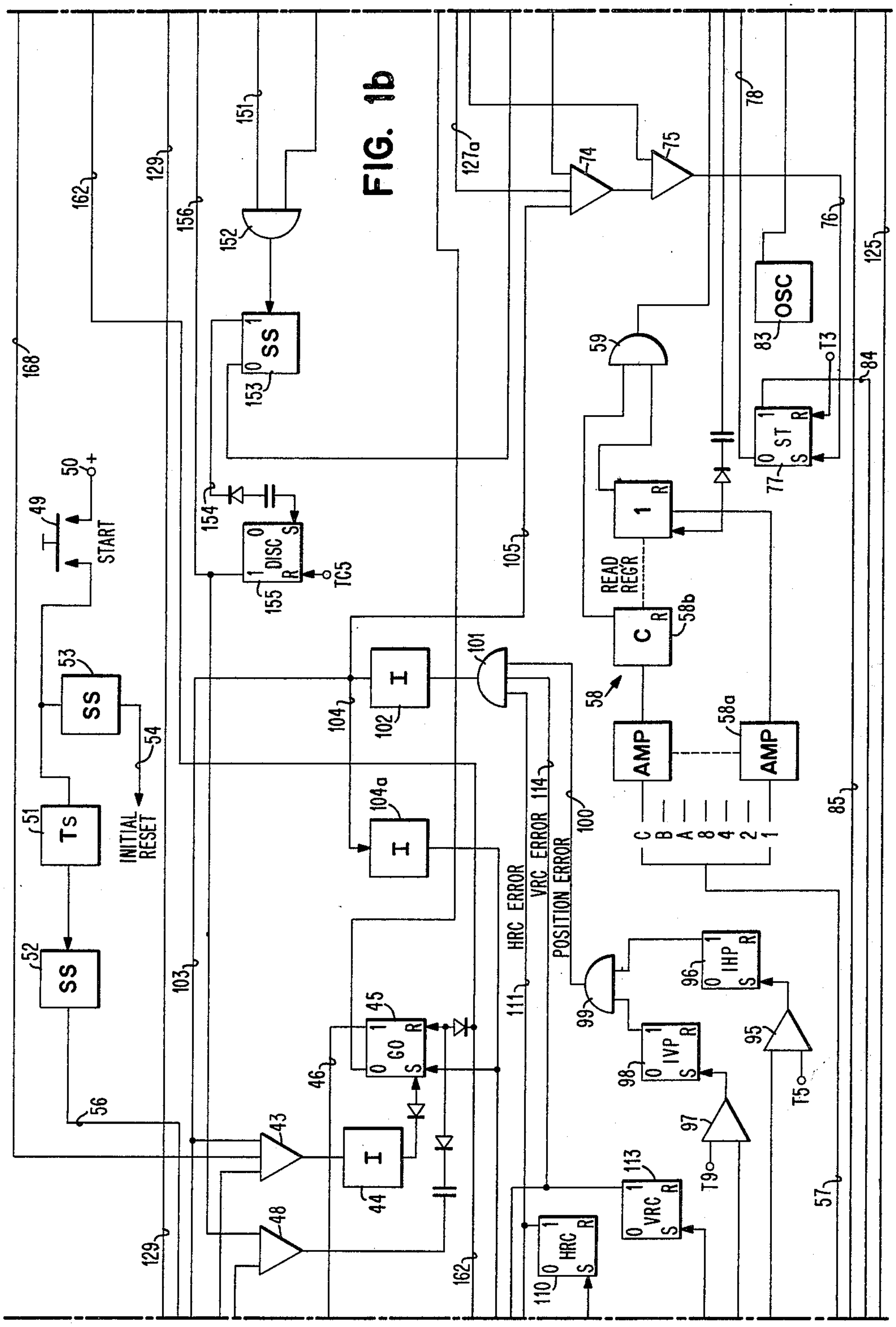
Figure 1C:
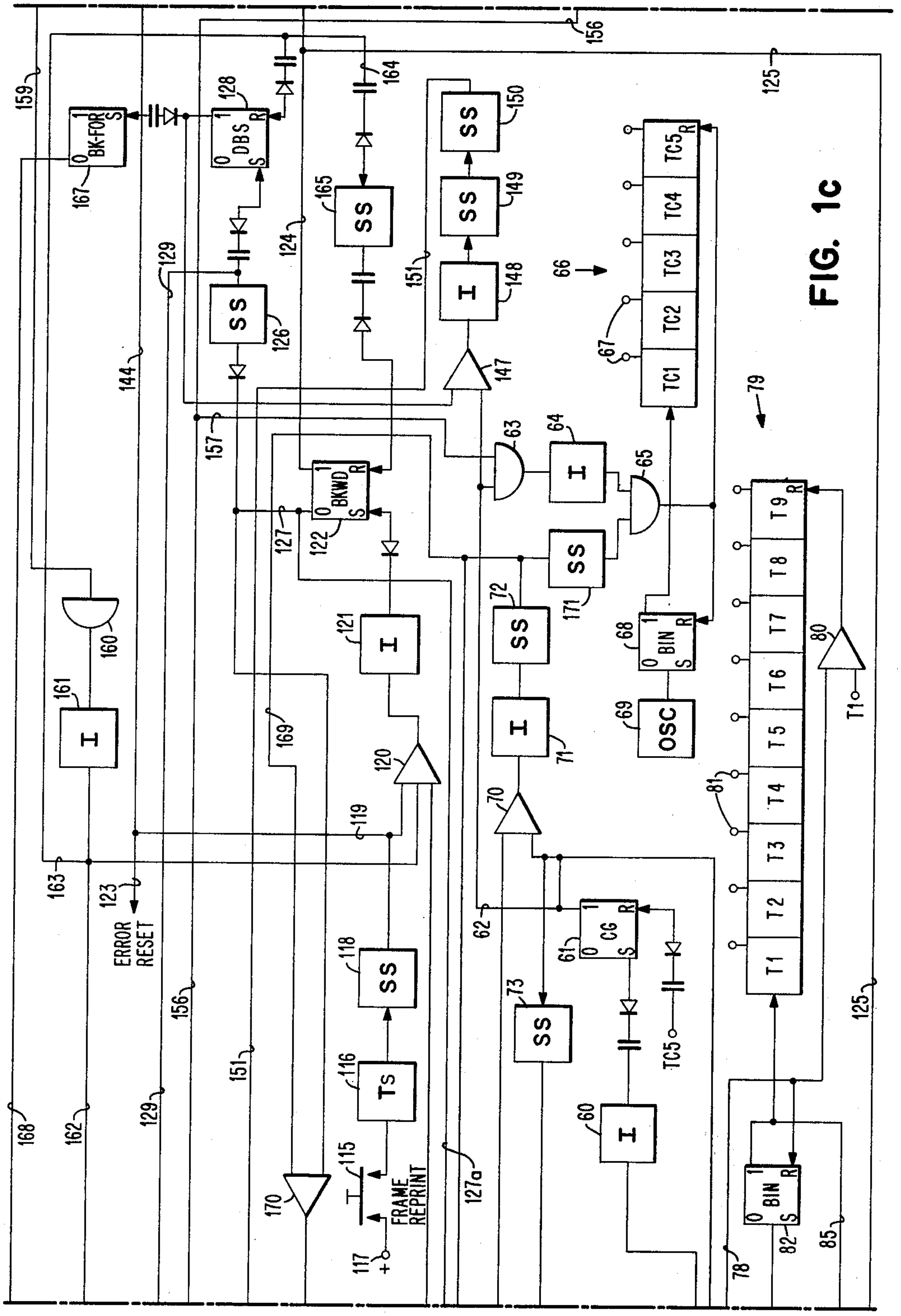
Figure 1D:
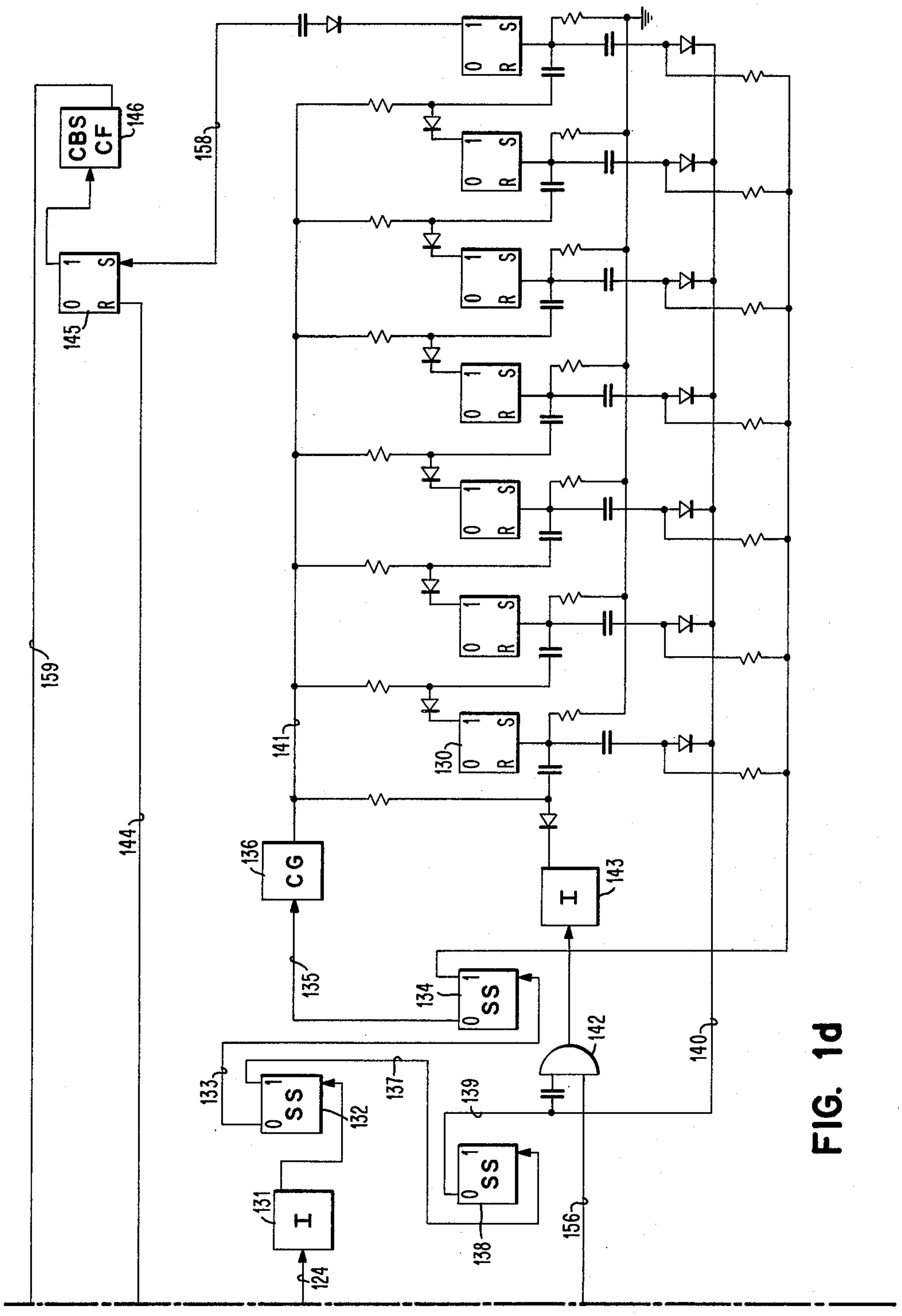

FIGS. 1*b*, 1*c*, and 1*d* are diagrams of the remaining logic circuitry for the frame reprint feature as applied to the system shown in FIG. 1*a*.

Referring to FIG. 1*a*, there is shown the general arrangement of the printer system for transforming information from magnetic tape into a character display on the face of a cathode ray tube. The Tape Reader 10, which scans the digital data recorded on a magnetic tape, may be any convenient type of reader such as, for example, the well-known "IBM" Type 729 Tape Reader. In the present instance, the information read from the tape is in a binary coded decimal seven bit code pattern with each alphanumeric character being expressed in the CBA8421 code. The CBA8421 notation refers to the seven recording channels on the tape and which run parallel to the length of the tape. A bit of information is represented by a magnetized spot in a channel and the channels BA8421 are used to record either a numeric or an alphanumeric character in binary form. The seventh or C channel is used to record a redundancy check bit. That is, either a 0 or 1 is recorded in the seventh channel so that across the seven channels there is an even number of 1's in each set of seven bits. When the tape is read, the number of 1's is automatically checked. If the number is odd, the machine stops and an error light is turned on. If the number of 1's is even, the machine continues the reading and writing process. For example, the character A would be recorded on the tape and read as 1110001. From the Tape Reader, the input information is passed to a suitable type of Tape Control unit or synchronizer 11, portions of which will be later described, which acts as a buffer storage between the tape unit and the printer. The control unit shapes and stores the information bits from the tape and interprets controls between the printer and tape unit, such as supplying the necessary delays for tapes to be reversed, stopped, etc.

From the Tape Control unit, the information is gated by means of a Diode Gate 12 into a seven bit Character register 13, and from the Character register, it is distributed into a Selection register 14 and the Horizontal and Vertical Positioning registers 15 and **15*a***. In a normal print operation, a print control character will follow a signal character to set up and initiate printing. The next two characters will determine the horizontal position of the first printed character, the next two characters will determine the vertical position, and the fifth character, through the Selection register, will determine the alphanumeric character to be printed. Each subsequent character will print an alphanumeric character, the Horizontal register advancing one character position per character after the first alphanumeric character has been positioned. Subsequent characters will be printed one per cycle, each character being automatically positioned one space to the right of the previous one, and printing will continue in this fashion until the end of a line is signaled by a signal character. The character following a signal character is recognized as a control character which selects the next line to be printed. Printing may be done at 128 characters per line, 76 lines per page, at 6 lines per inch.

The digital information in the Selection register and in the Horizontal and Vertical Positioning registers is directed to respective Digital-To-Analog converters 16 and 17 which convert the parallel digital information to a corresponding current for use in the selection deflection yoke 18 and the positioning deflection yoke 19 of the cathode ray tube 20. The system preferably makes use of digital-to-analog circuitry such as is fully disclosed in U.S. Patent No. 2,810,860, to which reference may be had for complete details of operation.

The cathode ray tube 20 is preferably of the image forming type wherein a tungsten lamp 21 and condenser lens assembly 22 are used to illuminate an external matrix array of symbols 23. The arrangement of the characters in the make-up of the letter chart on the matrix follows, in this case, from the standard teletype code and the use of binary stepped increments of horizontal and vertical deflection currents. The matrix is reduced by the lens 24 and focussed on the cathode ray tube photosensitive cathode 25 where the light images become current images. The photoelectrons liberated from the cathode when the matrix letter chart is projected on it are accelerated and focussed upon the plane of a selecting aperture 26. The aperture size is such that one letter only from the array can pass through it at a time. The magnetic deflection yoke coils 18 deflects the entire electron-image stream for letter-by-letter selection. The single-letter portion of the electron stream emerging from the aperture enters the positioning and reproducing end of the tube. Here it passes axially through a metal cylinder 27, the potential of which is maintained a few volts negative with respect to the aperture in order to suppress secondary emission. The cylinder 27 is under control of an Unblank Control trigger 28 and an unblank amplifier 29 to selectively pass the letter beam on to the high potential region where the positioning deflection yoke coils 19 focus and position the letter on the aluminized phosphor screen 30. The reproduced letters may be displayed in lines and columns as desired.

The data on the tube screen is photographically recorded on 35 mm. film by a conventional recording camera 31. The system preferably makes use of a recording camera such as is fully disclosed in Manual No. 203, dated July 1, 1955, and published by the Instrumentation Branch, Edwards A.F.B., California, to which reference may be had for complete details of operation. It will suffice to say here that a drive motor M is connected through a magnetic clutch-brake to a gear train which is the basic drive mechanism of the camera. This gear train, in turn, drives the shutter, in-out feed sprockets, the intermittent or frame positioning sprocket, and the synchronizing cams. On continuous or cine operation film may be fed at the rate of 16 frames per second. The system may be programmed to give a film advance at the end of a printed line or at the first end-of-record mark in that line. For example, referring to FIG. 1*a*, when an end-of-record mark is encountered on the tape in the Tape Recorder, a signal is emitted from the Tape Control unit 11 to set an End-Of-Record trigger 32. It will be understood that in the description of the system logic that follows, whenever a trigger is turned on or set the binary 1 output line will rise and the binary 0 output line will fall and that these outputs will reverse when the trigger is turned off or reset. The positive output from the trigger 32 is switched at T5 clock cycle time, to be later described, by an AND switch 33 to effect the setting of a Film Advance trigger 34. The positive output from the Film Advance trigger turns on the camera motor M to initiate a film advancing cycle. The camera gear train drives a cam 35 which coacts with the center strap of transfer camera contacts 36. The normally closed side of the camera contacts is connected to a negative voltage terminal 37 whereas the normally open side is connected to a positive voltage terminal 38, and approximately 70 milliseconds after the camera receives the impulse to feed film, the contacts will transfer to close the positive side and will remain there during film feeding. After one frame of film has been fed, the cam 35 will transfer the camera contacts back to close the negative side. The Film Advance trigger 34 is reset upon closure of the negative side of the camera contacts at the end of each feed cycle, and similarly, a Read trigger 39 is set through an inverter 40, rectifier 41, and single shot multivibrator 42. The positive output from the Read trigger is gated through an AND switch 43 and inverter 44 to a Go trigger 45 (FIG. 1*b*). The Go trigger, in effect, is set and the positive output therefrom is transmitted by wire 46 back to the Tape Control unit 11 to signal that the film feed has stopped and that another section of tape is to be fed and scanned by the tape reader. The Read trigger 39 can be reset through an OR switch 47 by the end-of-record signal from the tape control unit indicating that a film advance cycle is about to take place during which time there should be no scanning of the tape. The positive output from the reset side of the Read trigger is normally gated through an AND switch 48 to reset the Go trigger to signal the tape control unit that tape is not to be fed during the film advance cycle.

There has been briefly described thus far the general operation of the printer system. The description to follow will be concerned with the novel frame reprint arrangement as applied to a system of the foregoing type.

With film suitably loaded in the camera 31, the system is initially put into operation by depressing a start key 49 (FIG. 1*b*), located in the Tape Control unit 11, to connect the positive voltage terminal 50 to a well-known Schmitt trigger 51, which in turn triggers a 100 microsecond single shot multivibrator 52. Depression of the start key also turns on a 40 microsecond single shot multivibrator 53, having an initial reset output line 54. Although not shown, it will be understood that output line 54 is suitably connected to the reset side of various triggers, registers, etc., of the system to initially reset these components at the start of operation. The output from the single shot 52 is transmitted through line 56 to the set side of the Read trigger 39 (FIG. 1*a*) to turn this trigger on. The positive output from the Read trigger is also gated through the AND switch 43 and inverter 44 to turn on the Go trigger 45, and hence, the Tape Control unit is signalled to initiate the feeding and reading of a section of tape in the tape reader 10.

The first character read from the tape is transmitted via a cable 57 and loaded into a Read register 58 (FIG. 1*b*), which comprises an amplifier **58*a* and trigger 58*b* for each bit position, and the first bit of this character passing through an OR switch 59 and an inverter 60 will set a Character Gate trigger 61. The positive output from the Character Gate trigger is passed via line 62 through an OR switch 63, inverter 64, and OR switch 65 to the reset line of a closed clock ring 66** (FIG. 1*c*) in the Tape Control unit. The clock ring 66, when in a reset condition, has stage TC1 turned on with an output being delivered from the output terminal 67. The setting of the Character Gate trigger serves to disable the clock reset circuit, thereby conditioning the ring for operation. The Character Gate trigger output is similarly passed to the reset side of a Binary trigger 68 to condition this trigger for operation. A 476 kc. crystal controlled oscillator 69 is stepped down to 238 kc. by the Binary trigger 68, the output of which now drives the 5 stage clock ring to deliver timed outputs TC1 through TC5 at the output terminals to control the timing of the Tape Control unit. The positive output from the Character Gate trigger 61 is also gated through an AND switch 70 and inverter 71 to turn on a Record Gate 150 microsecond single shot multivibrator 72. At the end of a character cycle, which is approximately 33.7 microseconds in duration, the Character Gate trigger will be reset by the fall of the TC5 clock pulse from the last stage of the clock ring 66. The fall of the Character Gate trigger output will turn on a 10 microsecond single shot multivibrator 73, the output of which is gated through the AND switches 74 and 75 to bring up a CRT Write line 76 for 10 microseconds. The fall of the Character Gate trigger output is also connected to reset the Read register 58. The rise of the CRT Write line will set a Clock Start trigger 77 and the output line 78 from the "0" side of this trigger is a reset line which connects to a closed clock ring 79 in the printer through an AND switch 80. Similar to clock ring 66, when in a reset condition, stage T1 is turned on with an output being delivered from the output terminal 81 of stage T1. The setting of the clock start trigger 77 serves to disable the clock reset circuit, thereby conditioning the ring for operation. The reset line 78 is also connected to the reset side of a Binary trigger 82 and thus the Binary trigger is also conditioned for operation. A 333 kc. crystal controlled oscillator 83 is stepped down to 167 kc. by the Binary trigger 82, the output of which now drives the 9 stage clock ring 6 microseconds per stage to deliver timed outputs T1 through T9 at the output terminals to control the timing of the printer. The 10 microsecond signal on the CRT Write line is used to start the printer clock at the beginning of each tape cycle.

The output line 84 from the Clock Start trigger 77 and the clock drive output line 85 from the Binary trigger 82 are used to activate an AND switch 86 (FIG. 1*a*) at T1 time and the output from switch 86 turns on the Diode Gate 12. The Diode Gate conditions the Character Register 13 for operation, and at T1 time of each clock cycle of the clock ring 79, information read from the tape will be set in the Character Register. Following receipt of the signal character and the print control character for initiating a print cycle, the next two characters will be gated through an AND switch 87, under control of clock pulse T7 and a machine generated horizontal sample pulse which extends through the first two cycles of operation of the printer clock ring 79, to set the Horizontal Positioning register. In similar fashion, the next two characters received will be gated through an AND switch 88, under control of clock pulse T7 and a machine generated vertical sample pulse which extends through the next two cycles of operation of the printer clock ring 79, to set the Vertical Positioning register. Accordingly, the positioning deflection yoke 19 will be energized to position the character to be printed. The next character received will set the Selection register to select the desired character beam, and at T4 clock pulse time of the next clock cycle, the AND switch 89 will be activated to set the Unblank Control trigger 28. Accordingly, the selected character will be unblanked on the tube screen and photographed on the film. Successive character print cycles will follow until an end-of-record mark initiates a film advance cycle as previously described.

Referring to FIG. 1*a*, it will be noted that the outputs of the Horizontal Position register and the Vertical Position register are also directed through associated Position decoders 93 and 94. The decoders may take a number of forms but preferably comprise a suitable diode circuit arrangement which will permit certain predetermined characters which should not be accepted by the printer to gate through and give an error pulse. An error pulse from the Horizontal Position decoder 93 will be directed at T5 clock pulse time through an AND switch 95 to set an Invalid Horizontal Position trigger 96 (FIG. 1*b*), and in similar fashion, an error pulse from the Vertical Position decoder 94 will be directed at T9 clock pulse time through an AND switch 97 to set an Invalid Vertical Position trigger 98. An output from either the Horizontal Position trigger or the Vertical Position trigger will be directed through an OR switch 99, line 100, an OR switch 101, and an inverter 102 to lower a CRT Ready line 103. The CRT Ready line 103 is normally up, and the drop that occurs as a result of a positioning error, is transmitted by line 104, inverter 104*a*, and the OR switch 47 (FIG. 1*a*) to effect turn off of the Read and Go triggers 39 and 45 to stop tape feeding and reading operations. Also, when the CRT Ready line 103 drops, line 105 (FIG. 1*b*) will drop to disable the AND switch 74 and prevent the CRT Write line 76 from coming up and the Clock Start trigger 77 and printer clock 79 from turning on.

In addition to the error position checks, there are also provided in a Horizontal Parity checker 106 and a Vertical Parity checker 107 (FIG. 1*a*). Information in the character register is passed directly to these checkers by way of line 108. The Horizontal Parity checker 106 comprises seven binary triggers which correspond to the seven channels on the tape being read by the Tape Reader. If all of the channels of a tape record contain an even number of recorded bits, then the binary triggers will all be off and there will be no output error pulse. However, if one of the tape channels contained an odd number of bits, the corresponding binary trigger would be on and at end-of-record time, the resulting output error pulse would be gated through an AND switch 109 to set a Horizontal Redundancy Check trigger 110 (FIG. 1*b*). The output from trigger 110 is directed through the OR switch 47 to reset the Read trigger 39 and stop tape operations. Also, the rise on line 111 passes through the OR switch 101 and will be inverted by inverter 102 and lines 103 and 105 (FIG. 1*b*) will fall, thus disabling the AND switch 74 to prevent restarting of the printer clock 79. The Vertical Parity checker 107 comprises suitable diode circuitry for testing the CBA8421 channels of tape data. If the bits in the set of channels CBA8421 are odd, an output error pulse will be gated through an AND switch 112 at T2 clock pulse time to set a Vertical Redundancy Check trigger 113. In similar fashion, the output from trigger 113 is directed through OR switch 47 to reset the Read trigger and lines 103 and 105 will fall to prevent restart of the printer clock 79.

When any of the above-described errors occur and it is desired to take a reprint cycle of operation, a Frame Reprint switch 115 (FIG. 1*c*) is depressed to connect a trigger 116 to the positive terminal 117. Trigger 116 gives a sharp edge output pulse to trip a 100 microsecond single shot multivibrator 118, the output pulse of which, by way of frame reprint line 119, is gated through an AND switch 120 and an inverter 121 to set a Backward trigger 122. The 100 microsecond output pulse from the single shot 118 is also transmitted via the lines 119 and 123 to the reset side of the error triggers 96, 98, 110 and 113 to reset whichever triggers were turned on.

The Frame Reprint switch, Backward trigger and the related controls which will now be described are all located within the Tape Control unit 11 and are primarily concerned with controlling the tape feed mechanism and clutch to effect reverse movement of the tape preparatory to a reprint cycle. With the Backward trigger 122 set on, an output is delivered by way of lines 124 and 125 to put the Tape Control unit and Tape Reader in a reverse status wherein the tape drive clutch (not shown) will transfer to effect backward feeding of the tape. A Forward-To-Backward Delay 25 millisecond single shot multivibrator 126 (FIG. 1*c*) is provided to allow time for the tape drive clutch to mechanically transfer and settle. When the Backward trigger 122 was set, the output line 127 drops to turn on the single shot 126, and 25 milliseconds later when it turns off, a Delayed Backspace Call trigger 128 is set to condition the Tape Control unit for backward reading. The fall of the single shot 126 will also put a negative pulse on line 129 to set the Read trigger 39, which in turn sets the Go trigger 45 to actuate the tape drive and move the tape backwards.

Referring to FIG. 1*d*, there is shown an End-Of-Record counter which comprises seven binary triggers 130 capable of handling up to 128 records, which is the maximum number of records allotted to any one film frame. Although not shown connected, the counter will be reset after every film frame advances by way of the CRT Ready line 103. As was previously mentioned, on a frame reprint cycle, the error triggers are reset and the End-Of-Record counter is complemented and advanced one position. Then the tape drive is operated to run tape backward to its starting position for the frame to be reprinted under control of the counter which counts the gaps between the records. Referring to FIG. 1*c*, when the Backward trigger 122 was set, a positive pulse was delivered via line 124 to an inverter 131 (FIG. 1*d*) which turns on a 50 microsecond Carry Inhibit Delay single shot multivibrator 132. The resulting drop on output line 133 will turn on a 100 microsecond single shot multivibrator 134 and the resulting drop on its output line 135 will lower a Carry Gate 136 to prevent the counter from carrying. After 50 microseconds, single shot 132 will switch off and the negative pulse on output line 137 will turn on a 100 microsecond Complement Delay single shot multivibrator 138 and the output from multivibrator 138 will, via the lines 139 and 140, switch all of the triggers 130 to their opposite state which complements the value held in the counter. For example, if all of the binary triggers 130 or stages are turned on, the counter would register 127 in the binary form 1111111. Assuming that 5 records had been printed after which an error was detected and a frame reprint cycle initiated, then the counter would stand at 0000101 representing a 5 which is the number of record gaps that were counted during the forward feeding of the tape and which represent the number of record gaps that the tape has to be backed up prior to reprinting. When the counter is complemented, as described above, it will register 1111010 or 122 which is 5 less than the capacity of the counter. After the counter is complemented, the single shot 134 will switch off, and as a result, the Carry Gate 136 will rise and adjust the potential on line 141 so that carry between stages may be effected. Some 50 microseconds later the Complement Delay single shot 138 will switch off and the positive output on line 139 will, through an OR switch 142 and inverter 143, switch the first stage on to add one to the counter and the counter will now register 1111011 or 123. As will be seen, the purpose of automatically adding one to the counter is to enable the last or seventh stage of the counter to give an output signal when the tape has backed up the required number of records. It will also be noted that when the Frame Reprint button 115 (FIG. 1*c*) was depressed, a circuit was completed by way of line 144 to reset a trigger 145 (FIG. 1*d*) which in turn will turn off a Counter Backward Stop cathode follower 146 preparatory to counter operation during the reprint cycle.

The End-Of-Record counter has now been conditioned and the tape drive actuated to start moving tape backward. The last data character in record 5 on the tape, which was the last record printed in the present example, will now be sensed by the machine as the first data bit and will be entered in the Read register 58 (FIG. 1*b*). As in normal operation, the Read register will set the Character Gate trigger 61 (FIG. 1*c*) on and put the tape unit clock 66 into operation. The Delayed Backspace Call trigger 128 is now in the set condition, and as a result, the Character Gate output on line 62 is also gated through an AND switch 147 and inverter 148 to turn on a 500 microsecond Beginning-Of-Record single shot multivibrator 149. The Beginning-Of-Record single shot will repeatedly turn on and will remain on as long as characters are being gated in at 67 microsecond intervals. When the record gap between the beginning of record 5 and the end of record 4 on the tape is encountered, the Character Gate trigger 61 will not be fired and it will switch off and remain off during approximately 10 milliseconds of record gap time. The Beginning-Of-Record single shot 149 will turn off and in so doing will trigger on a 1 millisecond Backward Stop Delay single shot multivibrator 150. When single shot 150 falls, a negative output pulse is transmitted via line 151 and an OR switch 152 to turn on a 400 microsecond Disconnect Delay single shot multivibrator 153, and when multivibrator 153 falls, the negative output on line 154 turns on a Disconnect trigger 155. Turn on of the Disconnect trigger indicates that the tape has backed up one record group, and accordingly, the positive output from the trigger is transmitted via line 156, the OR switch 142 (FIG. 1*d*) and inverter 143 to advance the End-Of-Record counter by one and it will now register 1111100. The output from the Disconnect trigger will also be transmitted via line 156 and line 157, the OR switch 63, inverter 64, and OR switch 65 to start the tape unit clock 66 for another character cycle. It should be pointed out here that during backward movement of the tape, the data read will have no effect on the cathode ray tube and printing will not occur due to the fact that when the Backward trigger 122 was set, the output line 127 drops, and as a result, the line **127*a* also drops to disable the AND switch 74. With AND switch 74 disabled, the Clock Start trigger 77 cannot be turned on and the printer clock 79** will be inoperative until normal forward feeding of the tape is resumed.

The tape continues to move backward, and as each record gap is encountered, the Character Gate trigger 61 will fail to fire and the sequence, described above, will be repeated to turn on the Disconnect trigger 155 and cause the End-Of-Record counter to advance by one. The counter will register successively 1111101, 1111110, 1111111 and 0000000. The counter standing at 0000000 indicates that the tape has backed up the required 5 record gaps and is at the beginning of the first tape record for the film frame which is to be reprinted. When the counter reaches 0000000, an output pulse on the output line 158 of stage 7 will turn on the trigger 145 and the positive output of the trigger is transmitted via the cathode follower 146 and the Counter Backward Stop line 159, through an OR switch 160 (FIG. 1*c*) and an inverter 161, and line 162 to turn off the Read trigger 39 (FIG. 1*a*) and Go trigger 45 (FIG. 1*b*). The output from inverter 161 is also taken via line 163 to reset the Delayed Backspace Call trigger 128, and via line 164 to turn on a 2 millisecond Backward Reset Delay single shot multivibrator 165. After 2 milliseconds, the fall of multivibrator 165 will reset the Backward trigger 122. Additionally, the negative pulse on line 162 (FIG. 1*a*) is transmitted via line 166 to turn on the Film Advance trigger 34 to advance the film in camera 31 one frame.

The reset of the Delayed Backspace Call trigger 128 will turn on a 25 millisecond Backward-To-Forward Delay single shot multivibrator 167 (FIG. 1*c*), and when this multivibrator falls, a positive pulse on line 168 will condition the AND switch 43 (FIG. 1*b*) so that the Go trigger 45 may be turned on. After the one frame of film has been fed, the cam 35 will transfer the camera contacts back to close the negative side. The Film Advance trigger 34 will now be reset, the Read trigger 39 will be turned on through the inverter 40, rectifier 41 and multivibrator 42, and the Go trigger 45 will be turned on by way of the AND switch 43 and inverter 44. The machine is now conditioned for normal operation and normal forward feeding and reading of the tape follows. If the same error occurs again, it will be apparent that it is not of the spurious type in which case another frame reprint cycle would not be initiated. If no error occurs, printing will continue in a normal manner.

It should be pointed out that during normal forward feeding operation, the Record Gate 150 microsecond multivibrator 72 (FIG. 1*c*) is turned on every character cycle and remains on as long as characters are being gated in. When the end of a record is encountered and the Character Gate trigger 61 fails to fire, the multivibrator 72 will switch off and the drop on line 169 will lower the AND switch 170 causing the Disconnect Delay Multivibrator 153 to turn on. When multivibrator 153 turns off 400 microseconds later, Disconnect trigger 155 will be turned on to advance the End-Of-Record counter by one and to start the tape unit clock 66 for another character cycle. In this manner, the counter registers the number of record gaps encountered during normal forward feeding of the tape.

The turn on of the Disconnect trigger 155 coupled with an end-of-record signal will result in the Read and Go triggers being turned off and the Film Advance trigger being turned on to initiate a film frame advance.

It will be recognized that the above-described End-Of-Record counter for counting the record gaps on the tape and associated control circuitry for backing up the tape to a particular record is not limited to use with a cathode ray tube printer but may be readily adapted for use with other types of mechanical and nonmechanical type printers, or in applications where re-reading of sections of a tape is desired.

While the invention has been particularly shown and described with reference to a preferred embodiment thereof, it will be understood by those skilled in the art that various changes in form and details may be made therein without departing from the spirit and scope of the invention.

What is claimed is:

1. In a printer system, a tape reader operable in either a forward direction or in a reverse direction to feed and read tape records bearing digital input information, means for operating said tape reader in a forward direction to supply said information to said printer system, error detection means operable during forward feeding of said tape to sample said digital information, means responsive to said error detection means upon detection of an error to stop said tape reader, selectively operable means for effecting reverse operation of said tape reader to feed tape backward, a binary counter of the type in which the count advances to zero when the count capacity is exceeded, means for advancing the count in said counter by one for each tape record read in the forward direction, means controlled by said selectively operable means for causing the count in said counter to be complement and increased by one, means for advancing the increased complemented count in said counter by one for each tape record read in the backward direction, means responsive to said counter when the count exceeds its capacity and advances to zero for stopping the reverse operation of said tape reader, and means operable upon termination of said reverse operation to resume operation of said tape reader in a forward direction.

2. In a cyclically operable cathode ray tube printer system having control circuitry for transforming digital input information into a character display on the face of the tube, the combination of, a tape reader operable in either a forward direction or in a reverse direction to feed and read tape records bearing said digital input information, a cyclically operable recording camera for recording the displayed information onto film, said camera including means for advancing a frame of film after a plurality of displays have been recorded, means for putting said tape reader into forward operation to effect the recording of a plurality of tape records onto a frame of film, error detection means operable during forward feeding of said tape to sample the digital information being printed, means responsive to said error detection means upon detection of an error to disable said printer control circuitry and stop said tape reader, selectively operable means for effecting reverse operation of said tape reader to feed tape backward, counter means controlled by said tape reader and operable to count the number of tape records being read in either direction, means responsive to said counter when the number of tape records read backward is equal to the number of tape records read forward prior to said error detection for stopping the backward movement of said tape and for operating said camera advancing means to advance a new frame of film, which means operative at the end of the advance of said new frame to operate said tape reader in a forward direction, and means effective during forward operation of said tape reader to render said printer control circuitry operable whereby a frame reprint cycle is taken.

3. A cathode ray tube printer system as in claim 2 wherein said error detection means comprises a horizontal parity checker, a vertical parity checker, a horizontal position checker, and a vertical position checker, each of said checkers being operable to effect the disablement of said printer control circuitry and stopping of said tape reader upon detection of an error.

4. In a cyclically operable cathode ray tube printer system having control circuitry for transforming digital input information into a character display on the face of the tube, the combination of, a tape reader operable in either a forward direction or in a reverse direction to feed and read tape records bearing said digital input information, a cyclically operable recording camera for recording the displayed information onto film, said camera including means for advancing a frame of film after a plurality of displays have been recorded, means for putting said tape reader into forward operation to effect the recording of a plurality of tape records onto a frame of film, error detection means operable during forward feeding of said tape to sample the digital information being printed, means responsive to said error detection means upon detection of an error to disable said printer control circuitry and stop said tape reader, selectively operable means for effecting reverse operation of said tape reader to feed tape backward, an end-of-record counter, trigger means controlled by said tape reader for advancing said counter once for each tape record being read in the forward direction, means responsive to said selectively operable means for causing said counter to complement and add one, said counter also being controlled by said trigger means to advance one for each tape record being read in the backward direction, means responsive to said counter when it registers zero for stopping the backward movement of said tape and for operating said camera advancing means to advance a new frame of film, switch means operative at the end of the advance of said new frame to operate said tape reader in a forward direction, and means effective during forward operation of said tape reader to render said printer control circuitry operable whereby a frame reprint cycle is taken.

References Cited in the file of this patent

UNITED STATES PATENTS

| | | |
|---|---|---|
| 2,596,741 | Tyler et al. | May 13, 1952 |
| 2,900,132 | Burns et al. | Aug. 18, 1959 |
| 2,909,772 | Thornton | Oct. 20, 1959 |
| 2,972,127 | Lukoff | Feb. 14, 1961 |

OTHER REFERENCES

Publication: Review of Input and Output Equipment Used in Computing Systems, published by AIEE, March 1953 (pp. 78–79 relied on).